United States Patent [19]

DiGiovanni et al.

[11] Patent Number: 5,050,949
[45] Date of Patent: Sep. 24, 1991

[54] MULTI-STAGE OPTICAL FIBER AMPLIFIER

[75] Inventors: David J. DiGiovanni, Scotch Plains; Clinton R. Giles, Holmdel, both of N.J.

[73] Assignee: AT&T Bell Laboratories, Murray Hill, N.J.

[21] Appl. No.: 542,296

[22] Filed: Jun. 22, 1990

[51] Int. Cl.⁵ .............................................. G02B 6/26
[52] U.S. Cl. ..................................... 359/341; 385/24; 385/27; 372/6; 385/142
[58] Field of Search ............... 350/96.15, 96.16, 96.34; 372/6, 69; 330/4, 4.3, 5, 84, 85

[56] References Cited

U.S. PATENT DOCUMENTS 4,723,824 2/1988 Shaw et al. .................. 350/96.15
4,883,335 11/1989 Alferness et al. ............ 350/96.15
4,952,017 8/1990 Henry et al. ................. 350/96.15

OTHER PUBLICATIONS

Masuda et al., "High Gain Two Stage Amplification with Erbium-Doped Fiber Amplifier", Electronic Letters, 10th May 1990, vol. 26, No. 10, pp. 661-662.

Primary Examiner—John D. Lee
Assistant Examiner—John Ngo
Attorney, Agent, or Firm—Eli Weiss

[57] ABSTRACT

In this invention there is disclosed a multi-stage optical fiber amplifier for providing a new functon, that of gain equalization. The disclosed multi-stage optical fiber amplifier comprises at least two stages of amplification where each stage comprises an amplifying fiber having a different gain spectrum. In one embodiment the two stages, which can be pumped separately, have different dopant compositions to provide each stage with a different gain spectrum. The disclosed multi-stage optical fiber amplifier provides overall gain spectrum equalization of the amplified channels of long haul transmission lines. Typically, gain equalization can adjust the gain of one channel while maintaining the gain of a second channel constant. When used in combination with automatic gain control, the amplifier gain can be equalized dynamically to compensate for random variations in the relative optical power of wavelength-multiplexed signals to prevent system impairment caused by low-power channels.

8 Claims, 3 Drawing Sheets

MULTI-STAGE OPTICAL FIBER AMPLIFIER

TECHNICAL FIELD

This invention relates generally to an optical amplifier for lightwave communications and more particularly to a multi-stage optical amplifier for amplifying two or more channels where each amplifier stage has a different gain spectrum to provide the new function of signal gain equalization.

BACKGROUND OF THE INVENTION

New undersea and terrestrial lightwave systems are being considered that will use erbium-doped fiber amplifiers rather than currently used opticalelectronic regenerators to boost the optical signal. In a multi-channel optical transmission system, such as wavelength division multiplexed systems, where two or more signals of different frequencies are used to transmit information, it is imperative that each of the channels have equal transfer functions (gain as a function of wavelength) In long haul transmission systems, if the gain of one channel at an amplifier is different from that of another channel, even by as small as 0.1 dB, through each of the amplifiers, serious problems can result. Let us assume that in each amplifier of a long haul transmission line, channel A of wavelength $\lambda_1$ experiences a gain which is 0.1 dB greater than channel B of wavelength $\lambda_2$, and that the transmission line contains 100 amplifiers from end-to-end. Then, after passing through the 100 amplifiers, signal $\lambda_1$ of channel A can be as much as 10 dB greater than signal $\lambda_2$ of channel B. This difference of signal level between the two channels can result in an optical transmission system which, at best, may be marginal in performance. For example, if after passing through 100 amplifiers channel A is at a level which provides a good signal to noise ratio, the channel B which experienced less gain, may be at a signal level which has a very low signal to noise ration and may be too low to be useful. Additionally, each amplifier can provide only a finite amount of power to the signals being amplified. In practice, it has been observed that while the power of the amplifier is available to both channels, frequently it is not divided equally between the two channels. Often, the larger of the two signals will capture a proportionately larger portion of the available power and leave a disproportionate smaller share of the available power for the weaker signal. Thus, the stronger signal gets progressively stronger, relative to the weaker signal, as the two signals advance through the various amplifiers of a long haul transmission line. Clearly, a need exists for amplifier gain equalization in an optical fiber amplifier.

SUMMARY OF THE INVENTION

In this invention there is disclosed a multi-stage optical fiber amplifier for providing a new function, that of gain equalization. The disclosed multi-stage optical fiber amplifier comprises at least two stages of amplification where each stage comprises an amplifying fiber having a different gain spectrum. In one embodiment the two stages, which can be pumped separately, have different dopant compositions to provide each stage with a different gain spectrum. The disclosed multi-stage optical fiber amplifier provides overall gain spectrum equalization of the amplified channels of long haul transmission lines. Typically, gain equalization can adjust the gain of one channel while maintaining the gain of a second channel constant. When used in combination with automatic gain control, the amplifier gain can be equalized dynamically to compensate for random variations in the relative optical power of wavelength-multiplexed signals to prevent system impairment caused by low-power channels.

DETAILED DESCRIPTION

Rare earth doped fibers for amplifying weak signals for both local and trunk optical telecommunications networks are of particular interest because of their low insertion loss, broad gain bandwidth and polarization insensitive gain. In use, the doped optical fiber is normally transversely coupled to a pump so that a weak optical input signal at some wavelength within the rare earth gain profile experiences a desired amplification. Pump light which can be coupled into the optical fiber via a wavelength multiplexer may propagate either co-directionally or contra-directionally within the fiber relative to the signal. The wavelength multiplexer efficiently combines the pump and signal light into a single fiber.

Erbium-doped optical amplifiers when used as power amplifiers, repeaters and preamplifiers in lightwave systems have been responsible for significant improvement in the performance of long-distance transmission systems, networks, CATV distribution and the like. Important features of these amplifiers include high gain (>40 dB), low noise (near quantum limit) and high saturated output power (>10 dBm).

New undersea and terrestrial lightwave systems are being considered that would use erbium-doped fiber amplifiers rather than conventional opto-electronic regenerators to boost the optical signal. In wavelength-division multiplexed system, some means of equalizing the channels is needed to prevent large differences in optical power from accumulating after the signals have passed through a plurality of amplifier repeaters. Typical methods of obtaining amplifier gain equalization can be based on controlling filter devices such as interference filters, Fabry-Perot filters and integrated-optic components.

A new approach to obtaining gain equalization as disclosed herein is based on a multi-stage optical fiber amplifier having at least two optical fiber stages of amplification. The new function of gain equalization can be realized in a two stage fiber amplifier that has two doped fiber compositions to obtain, for each stage, a different gain spectrum. The multi-stage amplifier is inherently fiber-compatible and gain equalization is achieved by selectively controlling the pump power to the different stages to control the overall gain spectrum to equalize the output levels of the amplifier channels.

Figure 1:
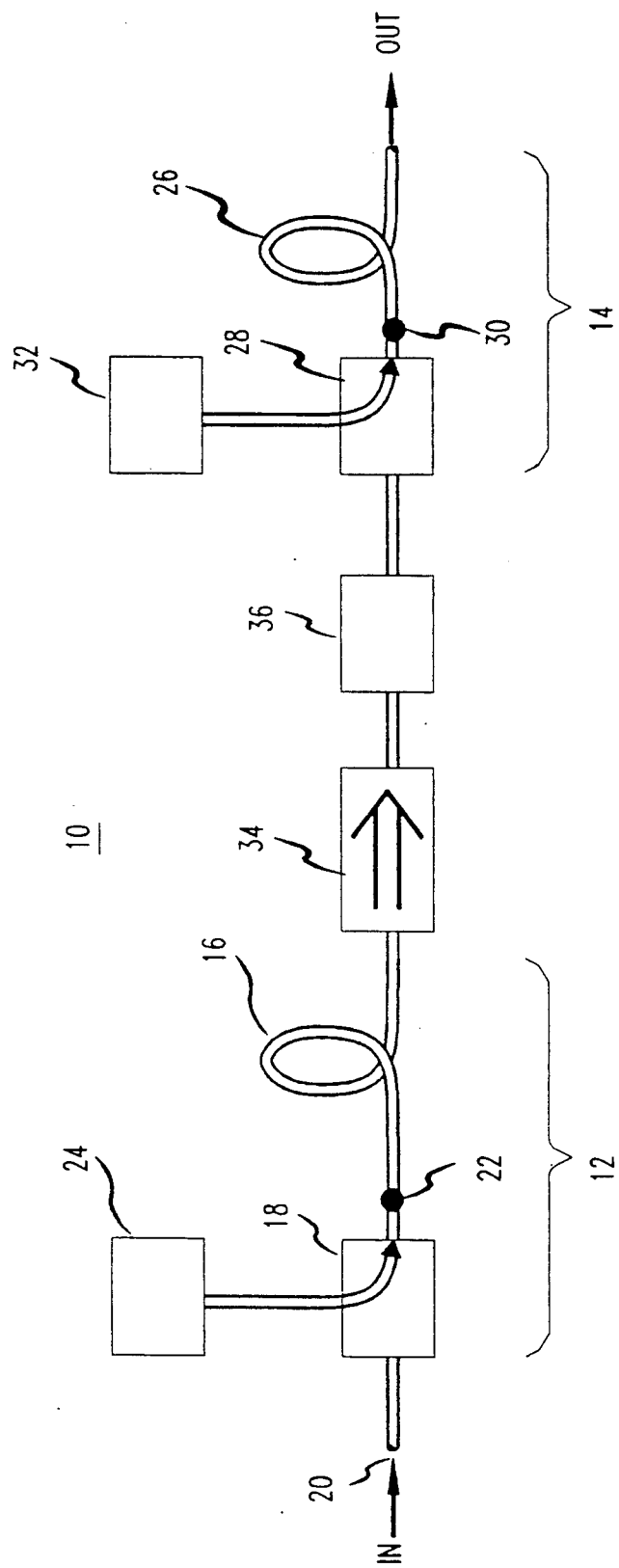
FIG. 1 illustrates a two stage fiber amplifier for dynamic gain equalization in a wavelength-multiplexed system in accordance with the principles of the invention.

Referring to FIG. 1, there is illustrated a multi-stage optical fiber amplifier in accordance with the principles of the invention for obtaining dynamic gain equalization. The multi-stage optical fiber amplifier 10 can comprise a first stage 12 and a second stage 14. The first stage 12 can comprise a doped amplifying fiber 16 which can comprise a germano-alumino-silicate core erbium-doped fiber. The fiber 16 is co-directionally pumped using a dichroic filter pump and/or signal multiplexer 18 positioned between a signal input port 20 and an input port 22 of the fiber 16. A high power 1.48 $\mu$m InGaAsP semiconductor laser diode 24 is coupled through the dichroic filter pump and/or signal multiplexer 18 to co-directionally pump the doped amplifying fiber 16. The second stage 14, which is coupled in cascade with the first stage 12 can comprise a doped amplifying fiber 26 which can comprise an alumino-silicate core erbium doped fiber. Fiber 26 can be co-directionally pumped using a dichroic filter pump and/or signal multiplexer 28 positioned to receive the signal from the first stage 12 and a signal input port 30 of the fiber 26. A high power 1.48 $\mu$m InGaAsP semiconductor laser diode 32 is coupled through the dichroic filter pump and/or signal multiplexer 28 to co-directionally pump the doped amplifying fiber 26. A single isolator 34 is positioned between the first stage 12 and the second stage 14 to suppress reflection-induced noise. An interstage bandpass interference filter having a bandwidth of 4.3 nm is also positioned between the first stage 12 and the second stage 14 to pass the amplified channels and to suppress amplified self-saturation of amplified spontaneous emission. In one embodiment, the norminal gain of the two stage amplifier was 22.6 dB at $\lambda_s = 1540.5$ nm after the 5.2 dB loss of the isolator 34 and filter 36.

The amplifying fibers 16 and 26 of FIG. 1 are described as being of a specific composition. But, it is known that the principal means of altering the amplifier gain spectrum of a fiber amplifier is to change the glass composition of the core in which the erbium ions reside. Additives to the silica may also raise the core refractive index needed for guided-wave propagation of light through the amplifier fiber. Thus, the amplifying fibers 16, 26 can have compositions which are different than specified above. For example, co-dopants that can be used in silica fiber can include for example, aluminum, germanium, hafnium, holmium, titanium, and zirconium. Often more than one of these co-dopants may be added in a single fiber. For example, a germano-aluminate fiber may contain germanium to raise the core index while the aluminum is added to flatten the erbium gain spectrum in the 1550 nm wavelength region. Also, a pure silica core can be used, yielding another amplifier gain spectrum. It is also noted that alternate glass types can be used, for example the fluoride and ZBLAN glasses, to achieve other gain spectral properties which can comprise operation at other wavelengths in addition to those in the 1.3 $\mu$m band.

Figure 2:
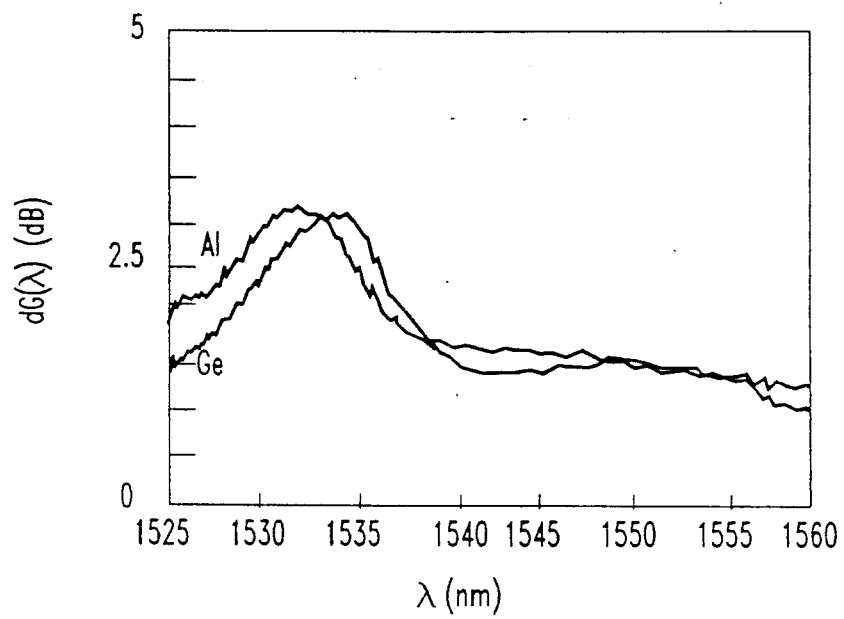
FIG. 2 illustrates the differential spectral gain characteristics of a two stage optical fiber amplifier wherein each stage comprises an erbium-doped fiber.

Referring to FIG. 2 there is illustrated the change in the gain spectrum measured separately of a two stage optical fiber amplifier when the pump powers were reduced to lower the peak gain by substantially 3 dB. The shape of the gain curves are universal in the absence of inhomogeneous gain saturation, they are influenced only by the emission and absorption spectra of the doped fiber and are independent of any other aspect of amplifier design. Thus, stated differently, the gain of each stage of the multi-stage amplifier is dependent upon the power of the pump signal to the erbium doped fiber. The multi-stage amplifier can be assumed to be a two-level gain medium. Therefore, the wavelength dependence of the gain difference measured in dB is dG ($\lambda_{si}$) is proportional to the sum of the ground-state absorption cross section $\sigma_a(\lambda_{si})$, and the upper-state emission cross section $\sigma_e(\lambda_{si})$.

Thus, it can be written that:

$$\frac{dG(\lambda_{si})}{dG(\lambda_{sj})} = \frac{\sigma_a(\lambda_{si}) + \sigma_e(\lambda_{si})}{\sigma_a(\lambda_{sj}) + \sigma_e(\lambda_{sj})}$$

The potential for gain equalization with the two stage amplifier is apparent from FIG. 2 by noting that, at wavelengths where the differential spectra cross, the net gain remains unchanged if the stages are operated in opposition, i.e., $dG_A(\lambda_{si}) = -dG_B(\lambda_{si})$.

But, a change in the net gain of the two stage amplifier will occur at all other wavelengths.

Figure 3:
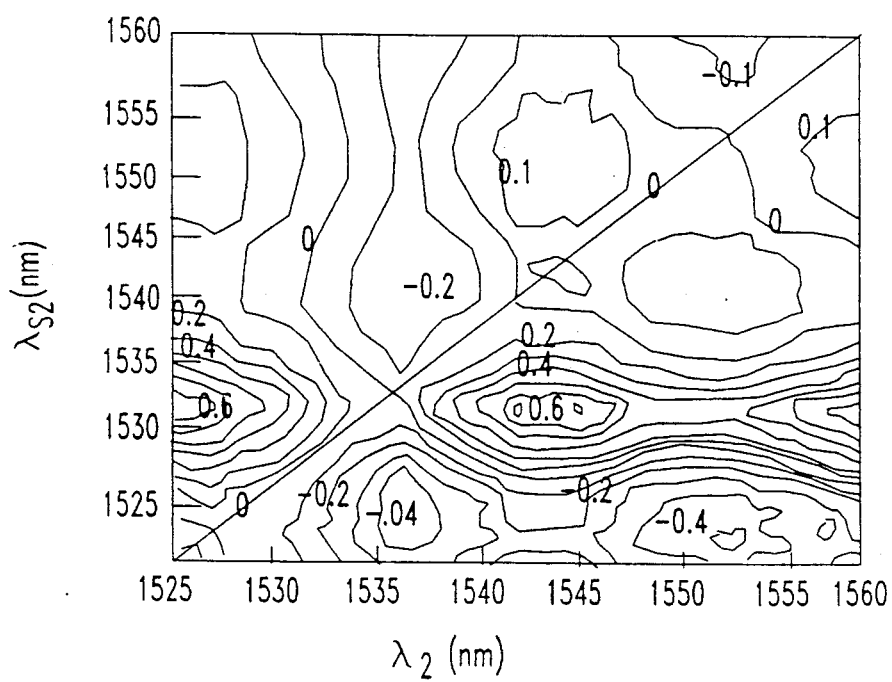
FIG. 3 illustrates the contour plot of the differential gain coefficient, $\delta G(\lambda_{s1};\lambda_{s2})$ for 0.1 dB/dB contour intervals of a two stage optical fiber amplifier wherein each stage comprises an erbium-doped fiber.

This is illustrated more generally in FIG. 3 which is a contour plot obtained by calculating the differential gain spectra. FIG. 3 is calculated from the differential gain spectra of FIG. 2a, to show the gain change at wavelength $\lambda_{s2}$ after adjusting the two-stage amplifier such that $dG_A(\lambda_{s1}) = -dG_B(\lambda_{s1}) = 1$dB, causing 0 dB net gain change at wavelength $\lambda_{s1}$. The gain equalization coefficient, which is equal to this gain change at $\lambda_{s2}$, is $$\delta G(\lambda_{s1}; \lambda_{s2}) = \frac{dG_A(\lambda_{s2})}{dG_A(\lambda_{s1})} - \frac{dG_B(\lambda_{s2})}{dG_B(\lambda_{s1})}$$

In general then, the net gain adjustment obtained at $\lambda_{s2}$ while attempting to equalize the amplifier gain is:

$$dG(\lambda_{s2}) = dG(\lambda_{s1})\delta E(\lambda_{s1}; \lambda_{s2})$$

where $dG(\lambda_{s1})$ is the differential gain trimming applied to the two stages at wavelength $\lambda_{s1}$. More specifically, FIG. 3 illustrates the change in the net gain at wavelength $\lambda_{s2}$, $\delta G(\lambda_{s1}; \lambda_{s2})$ after the gain at $\lambda_{s1}$ has been changed by +1 dB in the first stage and −1 dB in the second stage. Thus $\delta G(\lambda_{si}; \lambda_{s2})$ is the gain equalization coefficient in units of dB/dB, and is a measure of the gain excursions required in each stage to compensate for gain differences between the two channels.

With the multi-stage erbium doped fiber amplifier of FIG. 1, gain equalization coefficients as large as $\delta G(1535, 1545) = 0.6$ dB/dB are possible, although the interstage filter may have to equalize large gain differences between the channels. There are also wavelength pairs, other than degenerate cases of $\lambda_{s1} = \lambda_{s2}$, where $\delta G(\lambda_{s1}, \lambda_{s2}) = 0$, and dynamic gain equalization between two channels is not possible. This can be advantageous in those instances where it is desirable to dynamically equalize several channels with multiple-stage amplifiers without having complicated cross coupling while equalizing pairs of channels.

In our application of the multi-stage optical fiber amplifier, gain equalization was tested using two closely spaced channels, $\lambda_{s1} = 1540.5$ nm, $\lambda_{s2} = 1538$ nm where $\delta G(1540.5, 1538) = 0.15$ dB/dB. The interstage bandpass filter functioned not only to limit the ASE bandwidth, but to roughly equalize the gain difference between the two channels, which was 1.8 dB without filtering. The input power of each channel was 19 dBm.

Figure 4:
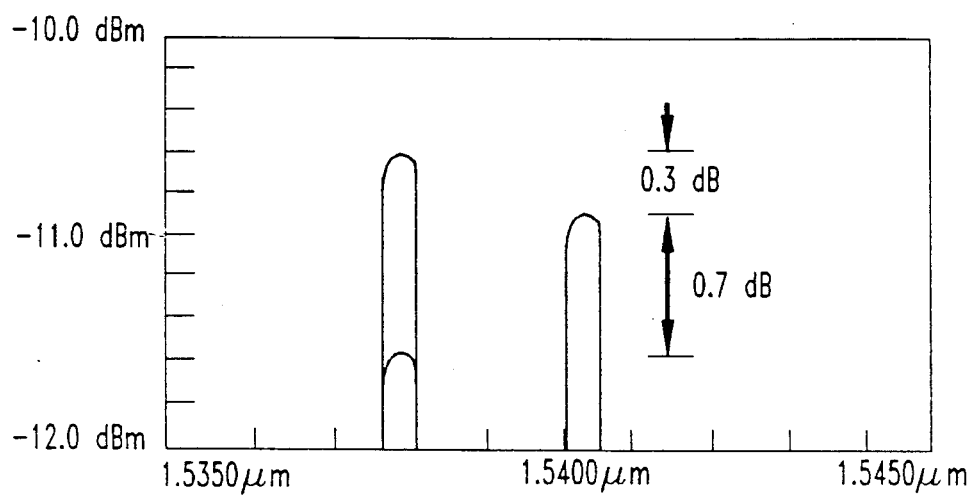
FIG. 4 illustrates the gain equalization of signals at $\lambda_{s1}=1540.5$ nm and $\lambda_{s2}=1538$ nm achieved by gain trimming in a two-stage amplifier. The amplifier gain at 1538 nm was carried over the range of $+0.32$ dB to $-0.68$ dB relative to the constant gain $G(1540.5)=22.6$ dB.

Referring to FIG. 4, there is illustrated the gain correction that was achieved for the 1538 nm signal upon trimming the gain of each stage. In this example, the gain at 1538 nm was initially 0.3 dB greater than at 1540.5 nm with the gain of the first and second stages being $G_A(1540.5) = 13$ dB and $G_B(1540.5) = 15$ dB respectively; the net gain being 22.6 dB. The relative gain at 1538 nm lowered to $-0.7$ dB upon adjusting the pump powers so that $G_A(1540.5) = 7$ dB; $G_B(1540.5) = 21$ dB, leaving the net gain at 1540.5 nm unchanged. This relative gain was adjustable to any value between $-0.3$ dB and 0.7 dB, including the situation where the net gains at 1538 nm and 1540.5 nm are equal. The total gain equalization, 1.0 dB may be a practical value for amplified systems that are initially tuned to provide approximately equal net gain for the two channels and have only residual gain errors to correct. Larger amounts of gain equalization can be obtained for pairs of more widely spaced channels; see FIG. 3.

Figure 5:
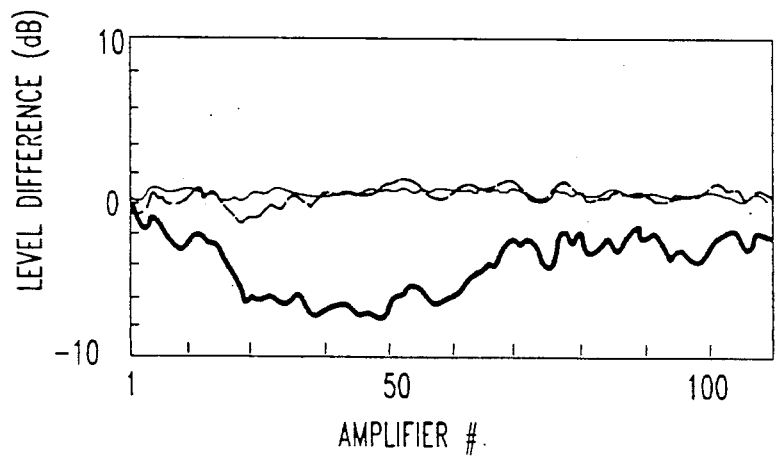
FIG. 5 illustrates level differences in dB of two channels in a WDM amplified lightwave system having 100 repeaters. The peak-to-peak random fluctuation is 2 dB between repeaters and the two-stage amplifier gain equalization coefficient is 0.1 dB/dB. Level differences are shown for uncorrected systems (the solid line), and dynamically equalized systems having gain trimming constraints of 6 dB per stage the dashed line and 12 dB per stage by the dotted line.

The behavior of an amplified long-distance lightwave system having gain equalization of two channels was simulated. Referring to FIG. 5, there is illustrated a calculation of the gain differences of two channels in a WDM amplified lightwave system having 100 repeaters. In FIG. 5 it is assumed that the gain fluctuation between channels at each repeater has a uniform distribution of 2 dB peak-to-peak about the nominal gain and $\delta G(\lambda_{s1}; \lambda_{s2}) = 0.1$ dB/dB. Causes for the gain variation include small random differences in the gain spectrum or polarization dependent losses at each repeater. These gain fluctuations may be time-varying but the gain equalization can track them dynamically using a control loop. To provide a realistic system, the gain trimming of each stage was constrained to be no greater than either 6 dB or 12 dB peak-to-peak from their nominal gain. Referring to FIG. 5, the uncorrected signal resulted in a maximum level difference between the two channels of 8.2 dB, which would result in a severe degradation of the signal-to-noise ratio in the low-power channel. But, with this invention of dynamic gain equalization, the maximum level difference was less than 2.3 dB when the gain trimming was constrained to 6 dB peak-to-peak and improved to 0.7 dB for a 12 dB limit. It is to be noted that although the leveling at each repeater may be incomplete because of the constraints on gain trimming, the incomplete leveling is corrected in following stages.

The potential of dynamic gain equalization is here demonstrated using a two-stage erbium doped fiber amplifier designed with different fiber compositions in the amplifier stages. The signal gain equalization obtained with the multi-stage fiber amplifier disclosed above can be used in long-distance amplified lightwave systems to prevent the accumulation of relative gain differences among channels in WDM transmission systems. With germano-alumino-silicate and alumino-silicate core erbium-doped fibers in the first and second stages of a two-stage amplifier, relative gain corrections of 1 dB were obtained for two channels spaced 2.5 nm apart. If required, larger gain differences can be corrected by optimizing the fiber compositions and selecting the channel wavelengths.

We claim:

1. A multistage optical amplifier for amplifying a signal of at least two different frequencies comprising a first stage of amplification for amplifying said signal comprising a core of a first composition within a cladding to form an optical amplifying fiber having an input port and an output port, a second stage of amplification for amplifying said signal comprising a core of a second composition within a cladding to form an optical amplifying fiber having an input port and an output port, said first composition of said core of said first stage of amplification being different from said second composition of said core of said second stage of amplification, means for generating a pump signal at a pump wavelength coupled optically to said first and second optical amplifying fibers, and optical mean interposed between the output port of said first stage of amplification and the input port of said second stage of amplification adapted to suppress reflection-induced noise and spontaneous emission from the first stage from causing saturation of the second stage.

2. The optical amplifier of claim 1 wherein one of said stages comprises an erbium doped silica fiber having a co-dopant selected from the group comprising aluminum, germanium, hafnium, holmium, titanium, zirconium and said other stage of said amplifier comprises an erbium doped silica fiber core having another composition.

3. the optical amplifier of claim 2 wherein one of said stages comprises an erbium doped fiber core of aluminosilicate.

4. The optical amplifier of claim 1 wherein said optical means comprises an optical filter adapted to pass the amplified signals and to suppress energy in the form of spontaneous emission from the first stage from causing saturation of the second stage.

5. The optical amplifier of claim 1 wherein said optical means comprises an optical isolator adapted to suppress reflection-induced noise.

6. The optical amplifier of claim 1 wherein said optical means comprises an optical filter adapted to pass the amplified signals and to suppress energy in the form of spontaneous emission from the first stage from causing saturation of the second stage, and an optical isolator adapted to suppress reflection-induced noise.

7. The optical amplifier of claim 1 wherein said means for generating a pump signal comprises a first wavelength multiplexer coupled to pass a received signal to the input port of said first stage, a first semiconductor laser diode coupled to said first wavelength multiplexer for supplying pump power to said first stage, a second wavelength multiplexer coupled to pass a received signal to the input port of said second stage, and a second semiconductor laser diode coupled to said second wavelength multiplexer for supplying pump power to said second stage.

8. The optical amplifier of claim 7 wherein said optical means comprises an optical filter adapted to suppress energy in the form of spontaneous emission from the first stage from causing saturation of the second stage, and an optical isolator adapted to suppress reflection-induced noise.

* * * * *